US006505289B1

(12) United States Patent
Han et al.

(10) Patent No.: US 6,505,289 B1
(45) Date of Patent: Jan. 7, 2003

(54) APPARATUS AND METHOD FOR INTERCONNECTING 3-LINK NODES AND PARALLEL PROCESSING APPARATUS USING THE SAME

(75) Inventors: Jong Seok Han, Taejon (KR); Sang Man Moh, Taejon (KR); Woo Jong Hahn, Taejon (KR); Suk Han Yoon, Taejon (KR)

(73) Assignee: Electronics and Telecommunications Research Institute, Taejin (KR)

( * ) Notice: Subject to any disclaimer, the term of this patent is extended or adjusted under 35 U.S.C. 154(b) by 0 days.

(21) Appl. No.: 09/475,049

(22) Filed: Dec. 30, 1999

(30) Foreign Application Priority Data

Dec. 13, 1999 (KR) .............................. 99-57298

(51) Int. Cl.[7] .............................................. G06F 13/00
(52) U.S. Cl. ......................................................... 712/11
(58) Field of Search ............................. 712/11, 12, 13, 712/15

(56) References Cited

U.S. PATENT DOCUMENTS

| | | | |
|---|---|---|---|
| 5,170,482 A | 12/1992 | Shu et al. ................... 395/800 |
| 5,420,982 A | * 5/1995 | Take ........................... 712/12 |
| 5,471,623 A | * 11/1995 | Napolitano, Jr. ............. 370/412 |
| 5,669,008 A | * 9/1997 | Galles et al. ................ 712/12 |
| 5,842,034 A | * 11/1998 | Bolstad et al. ................ 712/11 |
| 6,167,502 A | * 12/2000 | Pechanek et al. ............. 712/12 |
| 6,230,252 B1 | * 5/2001 | Passint et al. ............... 709/238 |

OTHER PUBLICATIONS

Stojmenovic; *Honeycomb Networks: Topological Properties and Communication Algorithms*; Sep. 21, 1996; pp. 1036–1042.

Lee, et al.; *Ring–Connected Networks and Their Relationship to Cubical Ring Connected cycles and Dynamic Redundancy Networks*; Dec. 9, 1993; pp. 988–996.

* cited by examiner

*Primary Examiner*—Eric Coleman
(74) *Attorney, Agent, or Firm*—Jacobson Holman PLLC

(57) ABSTRACT

The present invention relates to a node connection apparatus. The 3-link node interconnection apparatus and parallel processing apparatus using the same confirm expanding nodes freely, only using fixed three connecting links, and are suitable to normal packaging method because of easy dividing into $2^n$ (n>1) nodes. The apparatuses comprise the following nodes. The first node has three links connected to other nodes respectively. The second node has three links, one links of them is connected to the first node, and the other two links are in charge of connection of X+ direction, X– direction. The third node has three links, one link of them is connected to the first node, and the other two links are in charge of connection of Y+ direction, Y– direction. The fourth node has three links, one link of them is connected to the first node, and the other two links are in charge of connection of Z+ direction, Z– direction.

9 Claims, 6 Drawing Sheets

APPARATUS AND METHOD FOR INTERCONNECTING 3-LINK NODES AND PARALLEL PROCESSING APPARATUS USING THE SAME

1. Field of the Invention

The present invention relates to an apparatus for connecting nodes, especially, relates to a apparatus and method for interconnecting 3-link nodes, and parallel processing apparatus using the same.

2. Prior Art of the Invention

The parallel processing system can have good performance by managing operation in parallel, simultaneously using multiprocessor. The interconnection network connecting nodes organized multiprocessor and transferring data, is very important component dominating the characteristic and performance of a parallel processing system. Each node in the parallel processing system has multi-link for connecting the adjacent nodes. The number of link connected in nodes and the connecting method of link makes difference of the data transfer method. So, It dominates the characteristic and performance of a parallel processing system.

Currently, the interconnection networks adopted in commercial parallel processing system are mainly the bus, ring, crossbar, mesh, and Hypercube interconnection network. However the bus, ring, crossbar interconnection network have handicap in performance or cost for constructing a large scale parallel processing system, so these are used for constructing a small scale system. The mesh interconnection network can offer 2-dimensional mesh or 2-dimensional torus mesh connection network, when there are four connecting links in node, and can offer 3-dimensional mesh or 3-dimensional torus mesh connection network, when there are six connecting links in node. For example, the ASCI TFLOPS system which has been applied by the Intel organizes two x-y plane mesh interconnection network using five connecting links in node. It is difficult to be organized mesh interconnection network, when the number of connecting links is three. For solving this problem, Ivan Stojmenovic proposed a 'Honeycomb interconnection network' that is the modification of the mesh connection network, using fixed three connecting links in node in the paper, Ivan Stojmenovic, "Honeycomb Network: Topological Properties Also Communication Algorithms," IEEE Transactions on Parallel Also Distributed Systems, pp 1036–1042, October 1997. The Honeycomb interconnection network has the advantage of the mesh interconnection network that can expand feely using only fixed three links. However, it is difficult to divide Honeycomb interconnection network into $2^n$ (n>1) nodes. So, it is difficult to apply to the normal package method. The Hypercube interconnection network can offer 3-dimension Hypercube interconnection network, when there are three connecting links in node, can offer 4-dimension Hypercube interconnection network, when there are four connecting links in node, and can offer 5-dimension Hypercube interconnection network, when there are five connecting links in node. The Hypercube interconnecting network tends to increase in the number of links connected in node proportionally, as the nodes for connecting increase. For correcting the handicap of the Hypercube interconnection network, the F. P. Preparata et. al. proposed the Cube connected cycle interconnection network in the paper, F. P. Preparata et. al., "The cube-connected cycles: A versatile network for parallel computation," Communication on ACM, pp 300–309, May 1981. Also, I. Y. Lee et. al. demonstrated the relationship of the Hypercube interconnection network, the Cube connected cycle interconnection network, and the similar interconnection network in the paper, I. Y. Lee et. al., "Ring-Connected Networks and Their Relationship to Cubical Ring Connected Cycles and Dynamic Redundancy Networks," IEEE Transactions on Parallel and Distributed Systems, pp 988–996, September 1995. The Cube connected cycle interconnection network is able to connect n≦$2^n$ nodes using links, number of n in node, so it makes a pretty improvement comparing with the Hypercube interconnection network that can connect $2^n$ in node. However there is a limitation to the Cube connected cycle interconnection network, using fixed links in node, namely it is able to connect the maximum twenty four nodes when the number of connecting links is three in node. The R. Shu and others made an improvement in the Hypercube interconnection network and the Cube connected cycle interconnection network, and proposed the Improved Hypercube interconnection network in the paper, R. Shu. al., "Improved Hypercube Topology for Multiprocessors Computer Systems," U.S. Pat. No. 5,170,482, Dec. 8, 1992. The Improved Hypercube interconnection network is able to connect more links, and to shorten data transfer delay time than the existing others. However the Improved Hypercube interconnection network is a organization added connecting links to normal hypercube interconnection network, so by misfortune, it has the problem that it is not able to connect nodes having three connecting links.

FIGS. 1A–1C illustrate methods for connecting nodes using fixed three connecting links in existing parallel processing system. FIG. 1A illustrates the 3-dimensional Hypercube interconnection network. Each node in the 3-dimensional Hypercube interconnection network has three connecting links, and is able to connect the maximum 8 nodes. However when anyone wants to expand nodes, it is impossible to expand nodes because connecting links in each node are added proportionally. FIG. 1B illustrates the Cube connected cycle interconnection network. The Cube connected cycle interconnection network is improved on the Hypercube interconnection network. Namely, it expands more nodes using fixed number of connecting links than the Hypercube interconnection network does. Also it is able to expand dimension of the Hypercube form, using fixed three connecting links. However the connecting structure is complex as dimension increases, and the Cube connected cycle interconnection network is not suitable to normal packaging method installing nodes, $2^n$ nodes in one cabinet. FIG. 1C illustrates the Honeycomb interconnection network. The Honeycomb interconnection network is improved on the Mesh interconnection network that is in a difficult organizing using three connecting links. Namely, it expands more nodes using fixed three connecting links and the connecting structure is simple, expands nodes freely as the Mesh interconnection network does. But it is hard to divide into $2^n$ (n>1) nodes, so the Honeycomb interconnection network is not suitable to normal packaging method installing $2^n$ (n>1) nodes in one cabinet.

SUMMARY OF THE INVENTION

An embodiment of the present invention provides a method and apparatus for expanding nodes freely using fixed three connecting links, and for offering a normal packaging method with dividing $2^n$ (n>1) nodes. A three links node interconnection apparatus in parallel processing system, comprises four nodes. The first node has three links connected to other nodes respectively. The second node has three links, one link of them is connected to the first node, and the other two links are in charge of connection of X+ direction, X− direction. The third node has three links, one link of them is connected to the first node, and the other two links are in charge of connection of Y+ direction, Y- direction. Also the fourth node has three links, one link of them is connected to the first node, and the other two links are in charge of connection of Z+ direction, Z- direction.

A three links node interconnection method in parallel processing system, comprises four steps. The first step is connecting the three links of the first node to other nodes respectively. The second step is connecting one of the links of the second node to the first node, and is making the other two links be in charge of connection of X+ direction, X- direction. The third step is connecting one of the links of the third node to the first node, and is making the other two links be in charge of connection of Y+ direction, Y- direction. Also the fourth step is connecting one of the links of the fourth first node, and is making the other two links be in charge of connection of Z+ direction Z- direction.

A parallel processing apparatus comprises multiple three links nodes organized four nodes into one group, so it is easy to be divided.

Also, a computer-readable record medium recording instructions is offered for interconnecting the three links nodes to realize the following functions. The first function is connecting the three links of the first node to other nodes respectively. The second function is connecting one of the links of the second node to the first node, and is making the other two links be in charge of connection of X+ direction, X- direction. The third function is connecting one of the links of the third node to the first node, and is making the other two links be in charge of connection of Y+ direction, Y- direction. Also the fourth function is connecting one of the links of the fourth first node, and is making the other two links be in charge of connection of Z+ direction Z- direction.

BRIEF DESCRIPTION OF THE DRAWINGS

These Also other features, aspects, and advantages of the present invention will become better understood with regard to the following description, appended claims, and accompanying drawings where:

DETAILED DESCRIPTION OF THE INVENTION

The present invention overcomes the problem of existing interconnection network organized fixed three links in node. Namely, it overcomes the problem that although the Honeycomb interconnection network expands nodes freely, it is hard to divide into $2^n$ (n>1) nodes, so it is not suitable to normal packaging method installing $2^n$ (n>1) nodes in one cabinet. Also it overcomes the problem that although the Cube connected cycle interconnection and the Improved Hypercube interconnection network are able to connect more nodes than the existing Hypercube interconnection network, they are still restricted to expanding nodes. Thereby, it guarantees expanding nodes freely using fixed three connecting links, and is suitable to normal packaging method installing $2^n$ (n>1) nodes in one cabinet.

Each node has three connecting links, and four nodes organize one nodes group. One node of group is in charge of center connected to the other three nodes. The other nodes are in charge of connection to X+ direction, X- direction, Y+ direction, Y- direction, Z+ direction, Z- direction, respectively. Because one nodes group organized four nodes offers six connecting links, multiple nodes groups.can be organized into 2-dimensional mesh, 3-dimensional mesh interconnection network, or the maximum 6-dimensional Hypercube interconnection network.

Figure 1A:
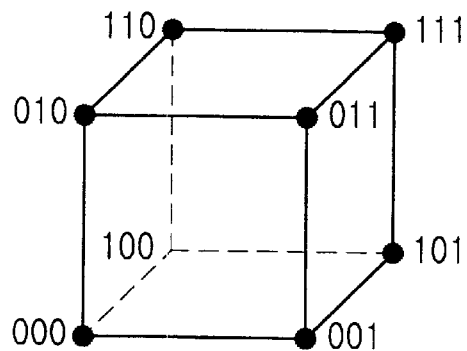
FIGS. 1A–1C illustrate methods for connecting nodes using fixed three connecting links in existing parallel processing system.
Figure 1B:
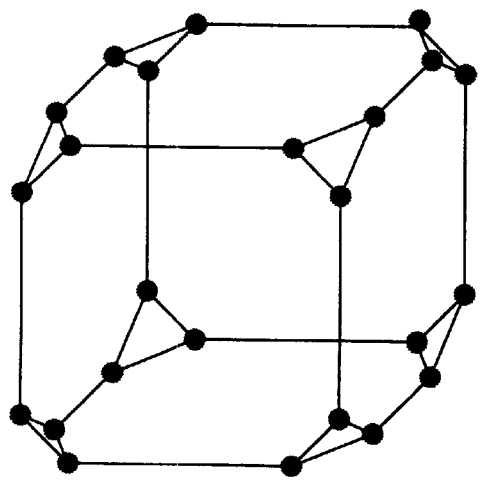
Figure 1C:
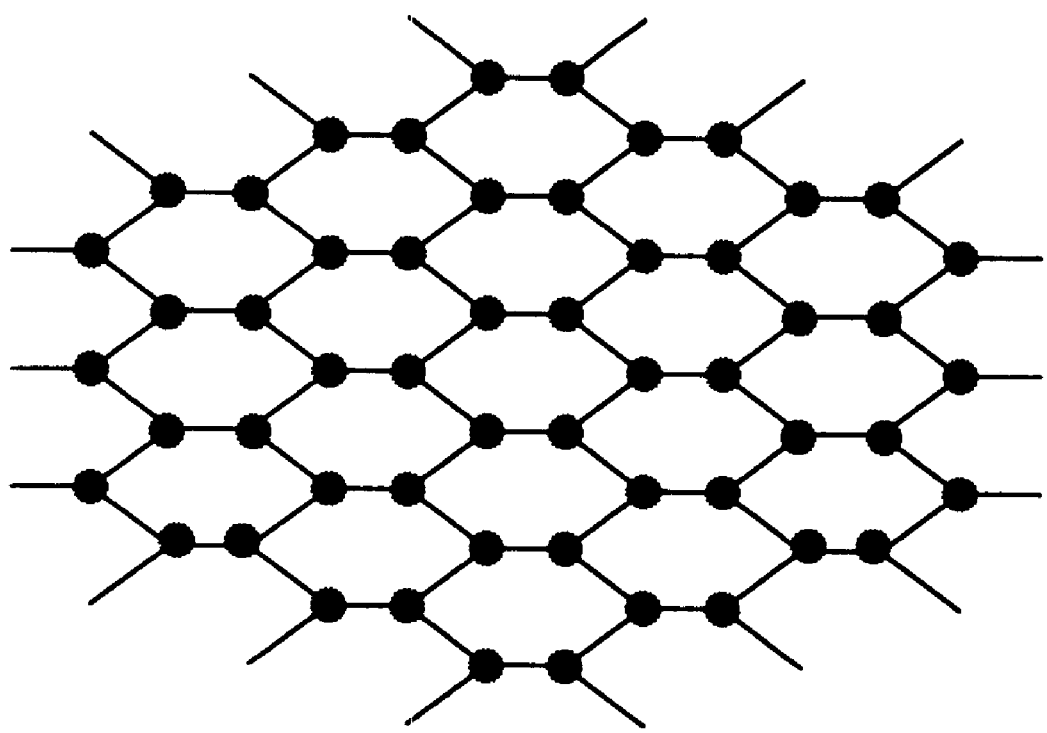
Figure 2:
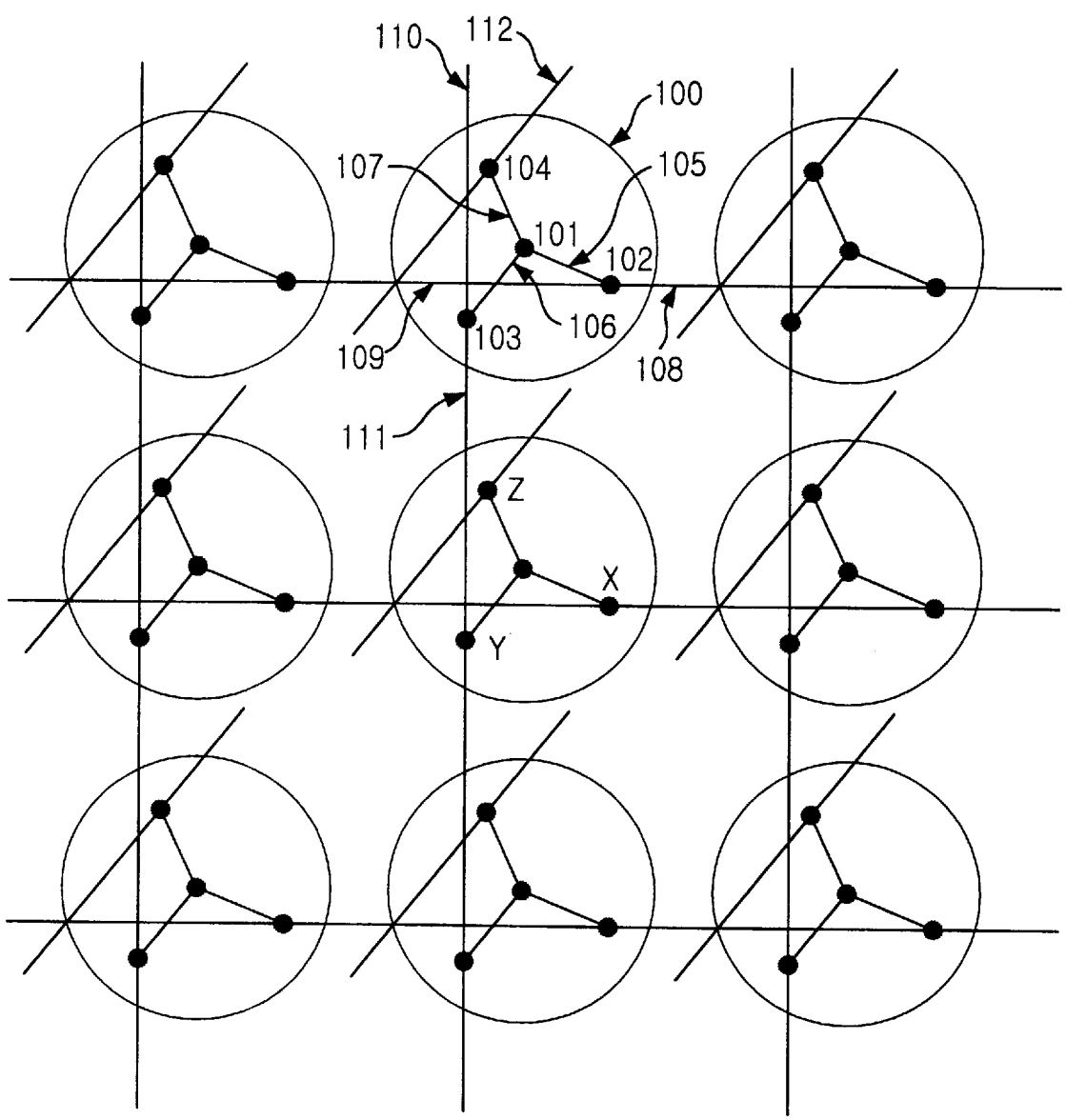
FIG. 2 is a graph illustrating the interconnection network of the present invention.

FIG. 2 is a graph illustrating improved interconnection network. The improved interconnection network is able to be adapted to normal packaging method, because it is able to expand nodes freely using fixed three connecting links, and it is easily divided into nodes, number of $2^n$ (n>1). Each node has fixed three connecting links, and four nodes 101, 102, 103, 104 organize one nodes group. One node of group is in charge of central node connected to the other three nodes. The other nodes 102, 103, 104 are in charge of connection to X+ direction, X- direction, Y+ direction, Y- direction, Z+ direction, Z- direction, respectively. Namely, each the remainder node 102, 103, 104 has three links. One of the three links 105, 106, 107 is connected to the central node 101, and the other two links 108–109, 110–111, 112–113 is connected to each direction X, Y, Z. Because one nodes group organized four nodes offers six connecting links 108, 109, 110, 111, 112, 113, multiple nodes groups is able to be organized into 2-dimensional mesh, 3-dimensional mesh interconnection network, or the maximum 6-dimensional Hypercube interconnection network.

Figure 3A:
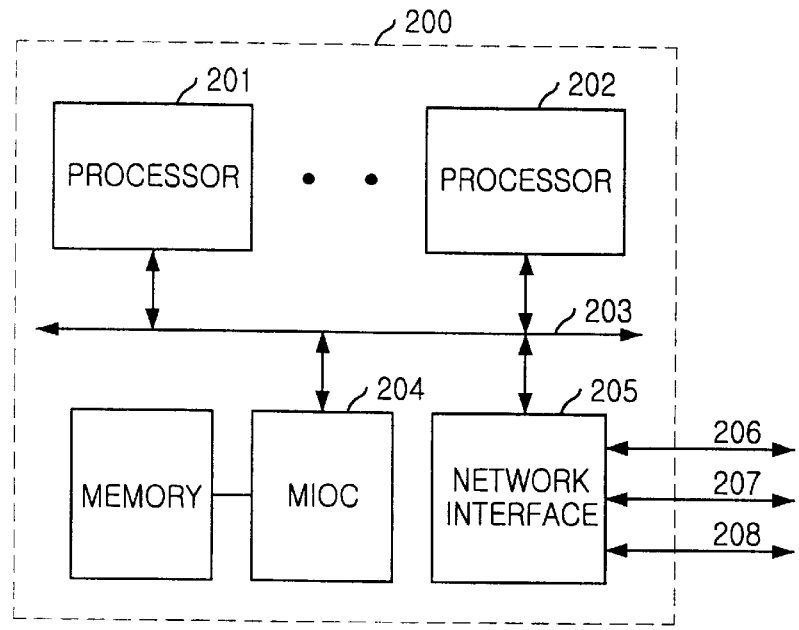
FIGS. 3A and 3B are block diagrams illustrating one node organizing parallel processing system.
Figure 3B:
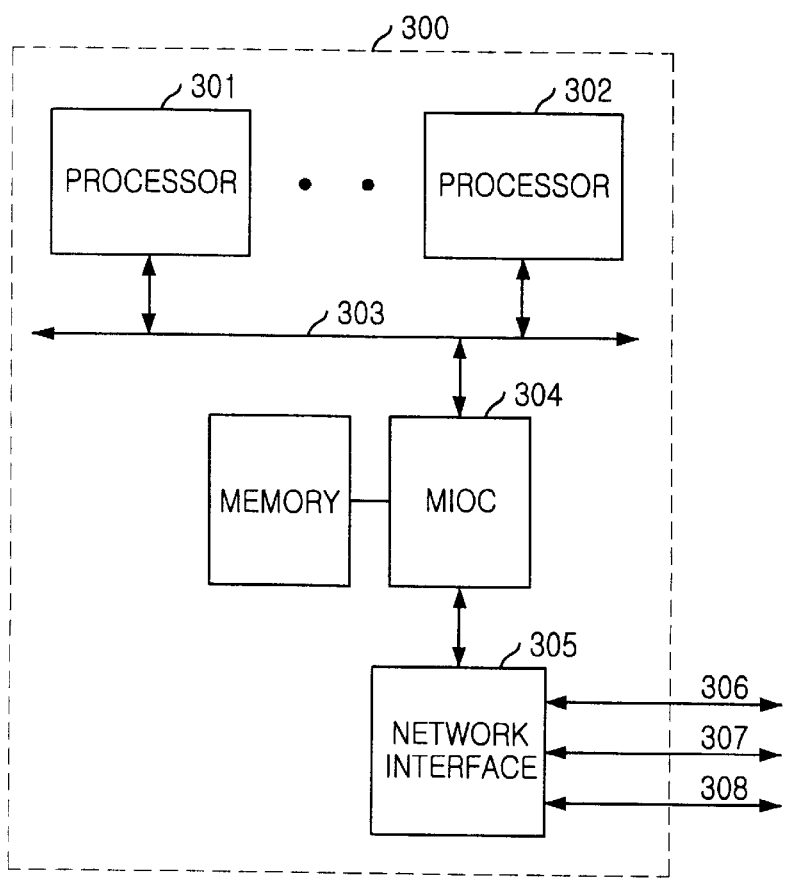

FIGS. 3A and 3B are a block diagrams illustrating one node organizing parallel processing system. A node is organized commonly with multiple processors, one memory, one input-output (I/O) controller, and network interface. Here, FIG. 3A is a block diagram illustrating a structure of a node 200 organizing mainly a CC-NUMA parallel processing system. Multiple processors 201, 202 are connected to processor bus 203, and one memory and I/O controller (MIOC) 204 controlling memory and input/output is connected to processor bus, too. Multiple processors and one MIOC 204 transfer data using the cache coherence protocol. The network interface 205 connected to the processor bus 203 performs data transferring to/from remote nodes. Also it performs the cache coherence protocol for preserving the coherence of remote cache memory. Namely, FIG. 3A illustrates a node offering three connecting links 206, 207, 208. FIG. 3B is a block diagram illustrating a structure of node 300 organizing a clustering parallel processing system based on mainly message passing. Multiple processors 301, 302 are connected to processor bus 303, and one MIOC 304 controlling memory and input/output is connected to processor bus 303, too. Likewise the node 200 organizing the CC-NUMA parallel processing system, multiple processors 301, 302 and one MIOC 304 perform data transferring using the cache coherence protocol. A network interface 305 is not connected to processor bus 303, but is connected to the MIOC 304, and performs data transferring based on message passing. The network interface 305 does not permit direct access of remote memory, or does not perform the cache coherence protocol. Namely, FIG. 3B illustrates a node offering three connecting links.

Figure 4:
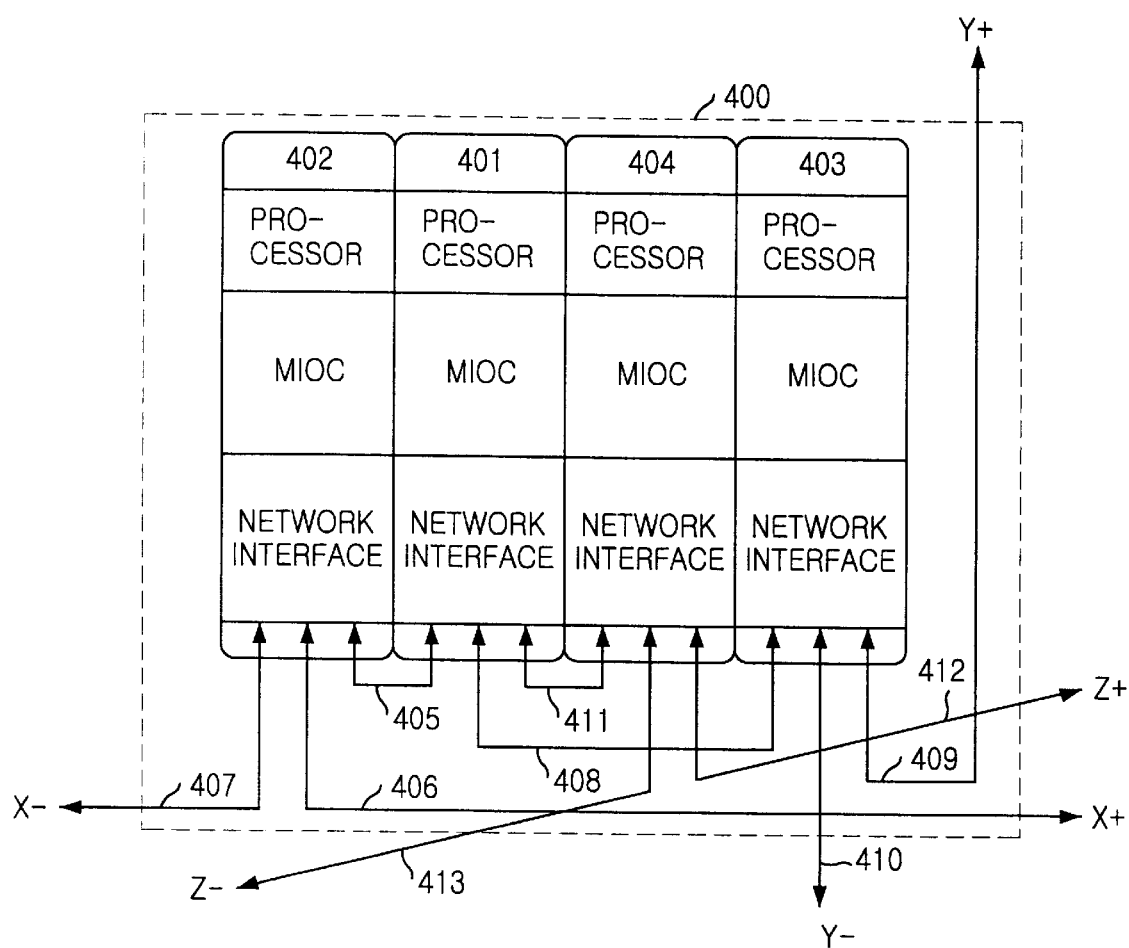
FIG. 4 is a block diagram illustrating organizing four nodes each having three connecting links into one nodes group.

FIG. 4 is a block diagram illustrating organizing four nodes each having three connecting links into one nodes group, namely illustrates four nodes each having three connecting links described in FIGS. 3A and 3B, into one group described in FIG. 2. In the manner of describing in FIG. 2, each node 401, 402, 403, 404 has fixed three connecting links, and four nodes organize one nodes group 400. One node 401 of group is in charge of central node connected to the other three nodes 402, 403, 404, and three links 405, 408, 411 of the central node 401 connect the other three nodes 402, 403, 404, respectively. Each the remainder node 402, 403, 404 except the central node 401, has three connecting links 405–407, 408–410, 411–413. One of the three links 405, 408, 411 is connected to the central node 401, and the other two links 406, 407, 409, 410, 412, 413 of three nodes 402, 403, 404 is connected to connecting link of the nodes group 400. So, one nodes group 400 has six connecting links 406, 407, 409, 410, 412, 413 offered each two links from the three nodes. The six connecting links of the nodes group is allocated to two links in X direction, two links in Y direction, and two links in Z direction, and organize into 2-dimensional mesh interconnection network, 3-dimensional network, or the maximum 6-dimensional Hypercube interconnection network.

Figure 5:
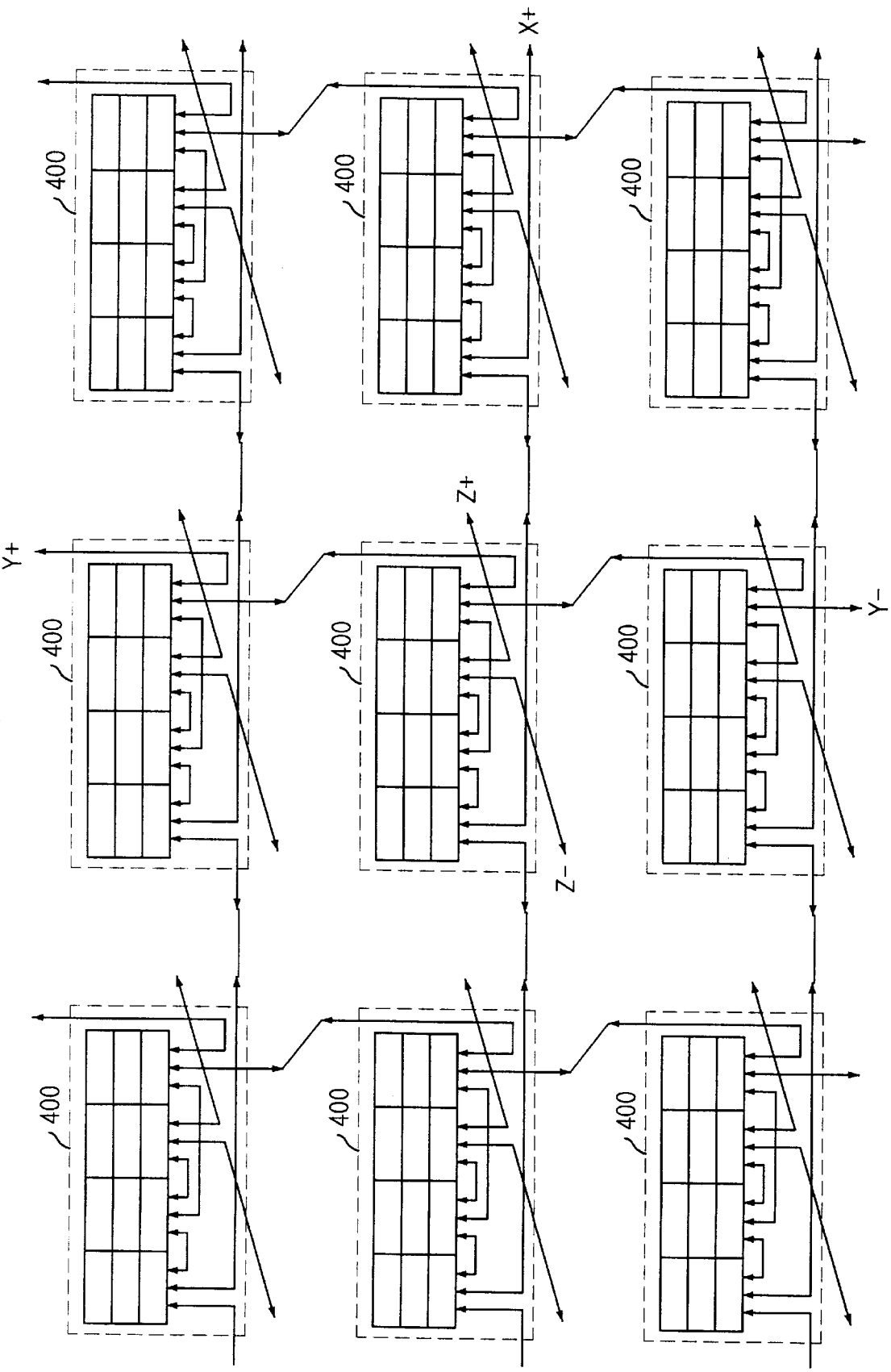
FIG. 5 is a block diagram illustrating the mesh formed parallel processing apparatus connected multiple nodes group.

FIG. 5 is a block diagram illustrating the mesh formed parallel processing apparatus connected multiple nodes group, namely illustrates organizing the mesh formed parallel processing system connecting multiple nodes group described in FIG. 4. The mesh formed parallel processing apparatus connects four nodes in the manner of the method described in FIG. 4, organizes one nodes group, and organizes multiple nodes groups into X–Y plain (2-dimensional) mesh interconnection network. The mesh formed parallel processing apparatus is able to organize X–Y–Z, 3-dimensional mesh interconnection network expanding to Z direction in accordance with organizing method, and is able to organize the maximum 6-dimensional Hypercube interconnection network. This connecting method is suitable to normal packaging method installing $2^n$ (n>1) nodes in one cabinet because it is 10 easily divided into $2^n$ (n>1) nodes. Also other advantage is easy connecting method.

Although the present invention has been described in terms of various embodiments, it is not intended that the invention be limited to these embodiments. Modification within the spirit of the invention will be apparent to those skilled in the art.

The advantage of the apparatus and method for interconnecting three- link nodes, and parallel processing apparatus using them, is freely expanding, connecting nodes using fixed three connecting links in node, and is suitable to normal packaging method, because of easy dividing into $2^n$ (n>1) nodes. Another advantage is easy expanding nodes, is easy connection connecting links within nodes, and is offering connection structure suitable to the normal packaging method, offering improved connecting method that is easy connecting within nodes groups.

What is claimed is:

1. A three-link node interconnection apparatus in a parallel processing system comprising:
   a first node having three links connected to other nodes respectively;
   a second node having three links, one link of the three links being connected to said first node, and the other two links being in charge of connection of X+ direction, X– direction;
   a third node having three links, one link of said three links being connected to said first node, and the other two links being in charge of connection of Y+ direction, Y– direction; and
   a fourth node having three links, one link of the three links being connected to said first node, and the other two links being in charge of connection of Z+ direction, Z– direction.

2. The apparatus as claimed in claim 1, wherein each node can be easily divided into $2^n$ (n>1) nodes.

3. A three-link node interconnection method used in a parallel processing system, comprising the steps of:
   a) connecting said three links of said first node to other nodes, respectively;
   b) connecting one of said three links of said second node to said first node, and making the other two links being in charge of connection of X+ direction, X– direction;
   c) connecting one of said three links of said third node to said first node, and making the other two links being in charge of connection of Y+ direction, Y– direction; and
   d) connecting one of said three links of said third node to said first node, and making the other two links being in charge of connection of Z+ direction, Z– direction.

4. A parallel processing apparatus using multiple three-link node interconnection apparatus, wherein each node can be easily divided because of being organized multiple three-link node interconnection apparatus by organization four nodes into one group.

5. The apparatus as claimed in claim 4, wherein said dividing is characterized by dividing into $2^n$ (n>1) nodes.

6. The apparatus as claimed in claim 4, wherein said multiple three-link node interconnection apparatus is characterized by being organized with 2-dimensional mesh interconnection network.

7. The apparatus as claimed in claim 4, wherein said multiple three-link node interconnection apparatus is characterized by being organized with 3-dimensional mesh interconnection network.

8. The apparatus as claimed in claim 4, wherein said multiple three-link node interconnection apparatus is characterized by being organized with 6-dimensional Hypercube interconnection network.

9. A computer-readable medium having stored thereon computer-executable instructions for performing a method for interconnecting 3-link nodes, said method comprising the steps of;
   connecting three links of a first node to other nodes respectively;
   connecting one of links of a second node to said first node, and to make the other two links being in charge of connection of X+ direction, X– direction;
   connecting one of links of a third node to said first node, and to make the other two links being in charge of connection of Y+ direction, Y– direction;
   connecting one of links of a fourth node to said first node, and to make the other two links being in charge of connection of Z+ direction, Z– direction.

* * * * *